US006888123B2

(12) United States Patent
Douma et al.

(10) Patent No.: US 6,888,123 B2
(45) Date of Patent: May 3, 2005

(54) METHOD AND APPARATUS FOR MONITORING A PHOTO-DETECTOR

(75) Inventors: Darin James Douma, Monrovia, CA (US); Stephan C. Burdick, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 172 days.

(21) Appl. No.: 10/435,119

(22) Filed: May 9, 2003

(65) Prior Publication Data

US 2004/0222360 A1 Nov. 11, 2004

(51) Int. Cl.[7] .............................................. H01J 40/14
(52) U.S. Cl. ............................. 250/214 R; 250/214.1
(58) Field of Search .......................... 250/214 R, 214.1, 250/214 DC, 214 SW; 379/9.02, 32.01; 398/135, 22, 24, 202; 455/78, 88

(56) References Cited

U.S. PATENT DOCUMENTS

| 4,498,001 | A | * | 2/1985 | Smoot ..................... 250/214 A |
| 5,481,118 | A | | 1/1996 | Tew |
| 5,805,641 | A | | 9/1998 | Patel |
| 5,956,168 | A | | 9/1999 | Levinson et al. |
| 5,981,936 | A | | 11/1999 | Fujiie |
| 6,188,059 | B1 | | 2/2001 | Nishiyama et al. |
| 6,333,804 | B1 | | 12/2001 | Nishiyama et al. |

FOREIGN PATENT DOCUMENTS

| JP | 2069980 | 3/1990 |
| JP | 4088371 | 3/1992 |

* cited by examiner

*Primary Examiner*—Que T. Le
(74) *Attorney, Agent, or Firm*—Workman Nydegger

(57) ABSTRACT

An optical signal detector monitoring circuit can include a current divider current mirror (CDCM) and a current multiplier current mirror (CMCM). A mirror leg of the CDCM generates a current corresponding with a part of the CDCM's primary leg current. The CMCM's primary leg couples to the CDCM's mirror leg. The CMCM generates a mirror leg current corresponding with a multiple of its primary leg current. Another circuit can include a first current mirror having a primary current leg (PCL), coupled between an optical signal detector and one of an electrical source and an electrical sink, that exhibits a resistance corresponding with a part of the resistance of the first current mirror's mirror current leg (MCL). The circuit's second current mirror has a MCL that exhibits a resistance corresnonding with a part of the resistance of the second current mirror's PCL, which couples with the first current mirror's MCL.

20 Claims, 9 Drawing Sheets

High Side Rx & Monitor Circuits

Internal and/or External Monitor Circuits

METHOD AND APPARATUS FOR MONITORING A PHOTO-DETECTOR

BACKGROUND OF THE INVENTION

1. Field of Invention

The field of the present invention relates in general to optical networks and more particularly to optical receivers.

2. Description of the Related Art

In communication systems light beams are increasingly used for transmitting information. The demand for communication bandwidth has resulted in a conversion of long and short haul communication trunk lines from copper to fiber optic (digital) communication. The wide spectral characteristics of fiber optics support broadband signals at very high data rates, gigabits per second.

Generally, an optical source, i.e. transmitter, converts an electrical signal, either digital or analog, to a modulated light beam which is then passed through an optical fiber to an optical detector, i.e. receiver, that extracts an electrical signal from the received light beam. A fiber may be shared with different communication channels using frequency, time or other forms of multiplexing. A typical optical link extends the range of a communication system with a transceiver unit that handles opto-electronic conversion between an optical fiber(s) and local area networks (LAN) on opposing ends of the fiber. Optical transceivers offer gigabit communication rates over long haul trans-oceanic cables or short range links in a metropolitan area.

Monitoring of optical transceivers is employed for diagnostic or preventive maintenance purposes. Monitored parameters include: laser bias current, transmit optical power, receive optical power, temperature, etc. A typical transmitter operates at a fixed power level. Since an optical link may range in distance from several meters to a hundred kilometers the optical receiver must function at a broad range of received signal strengths. Receiver monitoring is employed to assure the received signal is in appropriate range to ensure proper decoding of data at receiver.

What is needed are new means for monitoring optical receivers.

SUMMARY OF THE INVENTION

A method and apparatus is disclosed for monitoring an optical signal detector. The optical signal detector may be part of an optical receiver, transceiver or transducer. The monitoring of the photo-detector may be used to determine the strength of a received optical signal during setup or normal operation of an optical communication system. During normal operation received signal strength can be used to determine component aging. The monitor generates a mirror current which is highly compliant with the photo-detector current across a broad current range. The linearity of the monitor circuit makes it particularly suited for optical networks such as telecommunication networks with a broad range of lengths between network transceiver nodes. The monitoring circuit also exhibits extremely low power requirements above and beyond those required to power the optical signal detector.

In an embodiment of the invention the circuit for monitoring an optical signal detector, comprises a first and second current mirror. The first current mirror has a primary current leg and a mirror current leg, and with the primary current leg exhibiting a resistance corresponding with a fractional part of the resistance exhibited by the mirror current leg, and with the primary current leg of the first current mirror series coupled between the optical signal detector and one of an electrical source or an electrical sink. The second current mirror has a primary current leg and a mirror current leg, and with the mirror current leg of the second current mirror exhibiting a resistance corresponding with a fractional part of the resistance exhibited by the primary current leg of the second current mirror, and with the primary current leg of the second current mirror series coupled with the mirror current leg of the first current mirror.

In an alternate embodiment of the invention the circuit for monitoring an optical signal detector, comprises a current divider current mirror and a current multiplier current mirror. The current divider current mirror has a mirror leg and a primary leg. The primary leg is coupled to the optical signal detector. The current divider current mirror is configured to generate mirror leg current corresponding with a fraction of the primary leg current. The current multiplier current mirror has a mirror leg and a primary leg coupled to the mirror leg of the current divider current mirror. The current multiplier current mirror is configured to generate mirror leg current corresponding with a multiple of the primary leg current.

In an alternate embodiment of the invention an optical transceiver with an optical signal generator and an optical signal detector is disclosed. The optical transceiver includes a current divider current mirror and a current multiplier current mirror. The current divider current mirror has a mirror leg and a primary leg coupled to the optical signal detector. The current divider current mirror is configured to generate mirror leg current corresponding with a fraction of the primary leg current. The current multiplier current mirror has a mirror leg and a primary leg. The primary leg is coupled to the mirror leg of the current divider current mirror. The current multiplier current mirror is configured to generate mirror leg current corresponding with a multiple of the primary leg current.

A method for monitoring an optical signal detector is also disclosed.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

A method and apparatus is disclosed for monitoring an optical signal detector. The optical signal detector may be part of an optical receiver, transceiver or transducer. The monitoring of the photo-detector may be used to determine the strength of a received optical signal during setup or normal operation of an optical communication system. During normal operation received signal strength can be used to determine component aging. The monitor generates a mirror current which is highly compliant with the photo-detector current across a broad current range. The linearity of the monitor circuit makes it particularly suited for optical networks such as telecommunication networks with a broad range of lengths between network transceiver nodes. The monitoring circuit also exhibits extremely low power requirements above and beyond those required to power the optical signal detector.

Figure 1:
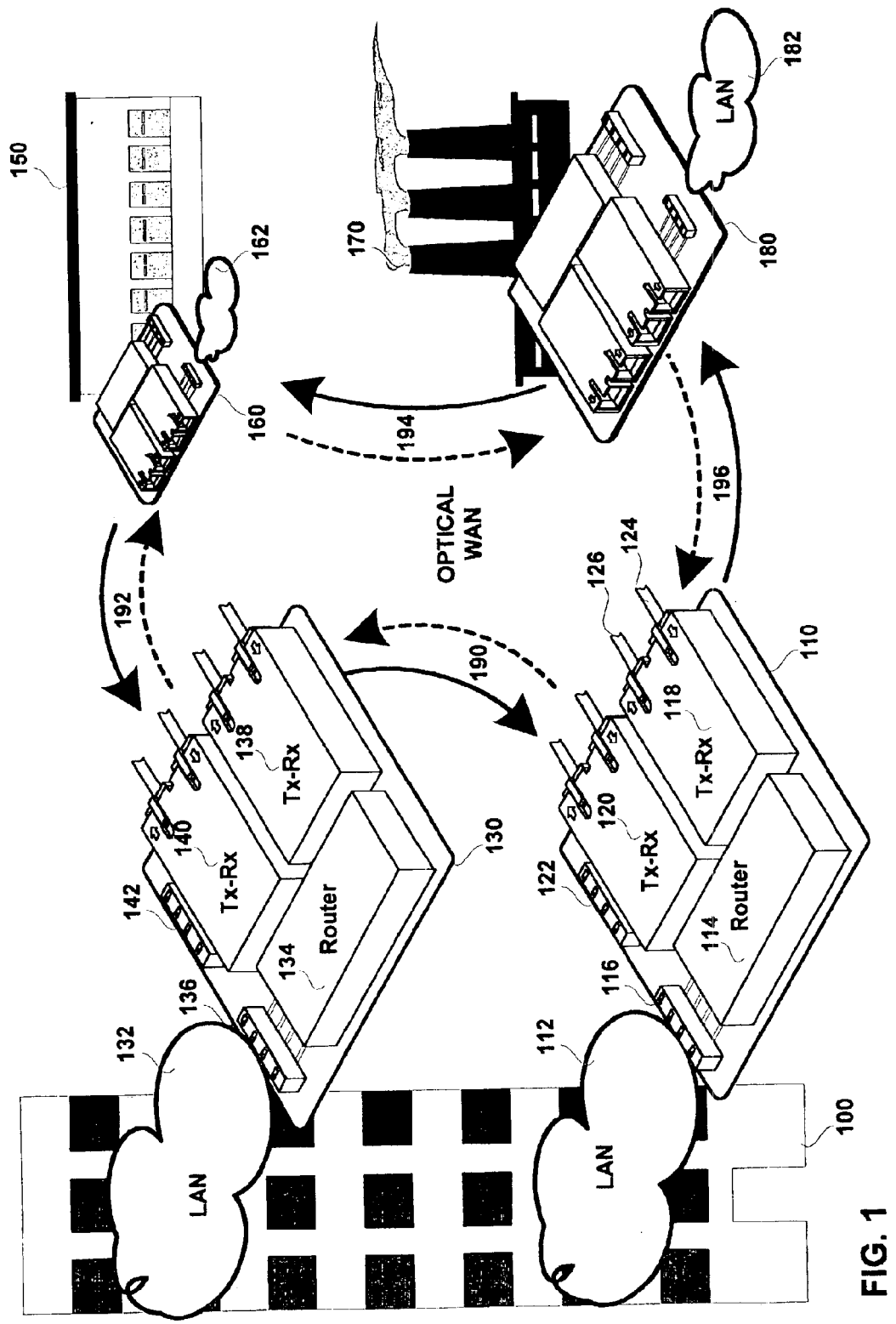
FIG. 1 shows a plurality of optical transceivers coupled to one another to form a wide area network (WAN).

FIG. 1 shows a plurality of optical transceivers coupled to one another to form a wide area optical network (WAN) which handles communications between a plurality of local area networks (LANS) LANS 112, 132 are shown in a corporate headquarters 100. LAN 162 is shown in the corporate warehouse 150. LAN 182 is shown in the corporate factory 170. All LANS are linked by a high speed optical backbone network. Optical segments of the optical network may vary in length from a few meters to hundreds of kilometers. At each corporate location the corresponding LAN provides electrical communication links to networked workstations, servers, process machinery, etc. To handle the high bandwidth communication between LANs optical transceiver cards 110, 130, 160 and 180 are shown coupled to LANS 112, 132, 162 and 182 respectively. These optical transceiver cards are optically linked together in a ring, star or other configuration to form the nodes of the optical backbone network which handles high speed communications between the LANs. The topology shown is a dual ring.

In the embodiment shown, each optical transceiver card comprises a pair of dual port transceivers and a router. Each transceiver card forms a node of the optical network. The optical network links the LANs. The transceiver cards in the example shown are coupled in a dual ring topology with ring segments 190, 192, 194, 196. Each transceiver is shown receiving and transmitting optically modulated information from either of the dual rings. Each transceiver has a receive port and a transmit port coupled to the corresponding segments of each ring. Information can be thought of as passing clockwise in one ring and counterclockwise in the other of the dual rings. All transceivers perform an optical-to-electrical conversion on received data which is then analyzed by an integral router to determine its destination. If the information is determined by one of the routers to be destined for a LAN to which the transceiver card is coupled then the router offloads the information from the optical network to the corresponding LAN.

Optical card 110 includes two transceivers 118, 120 and a router 114. The router 114 couples through a LAN interface 116 with LAN 112. The transceivers couple via corresponding pairs of transmit and receive ports to the corresponding network segments which form the dual optical ring topology. Fiber optic cables 126 and 124 handle the transmission and reception respectively of information between line cards 110 and 180 via ring segments 196. Another pair of fiber optic cables (not shown) handle the transmission and reception of information between line cards 110 and 130 via ring segments 190. Monitoring of the transceivers 118–120 occurs via the monitor interface 122.

Optical card 130 includes two transceivers 138, 140 and a router 134. The router 134 couples through a LAN interface 136 with LAN 132. The transceivers couple via corresponding pairs of transmit and receive ports to the corresponding network segments which form the dual optical ring topology. Fiber optic cables (not shown) handle the transmission and reception of information between line cards 130 and 160 via ring segments 192. Monitoring of the transceivers 138–140 occurs via the monitor interface 142. Line cards 160 and 180 are coupled to one another with ring segments 194.

Monitoring is employed for diagnostic or preventive maintenance purposes such as determining when to replace a component based on monitored parameters. Component aging or life cycle stage can be determined based on monitored parameters, with the result that components are replaced before failure. Monitored parameters include: laser bias current, transmit optical power, receive optical power, temperature, etc. A typical transmitter operates at a fixed power level. Since an optical link may range in distance from several meters to a hundred kilometers the optical receiver must function at a broad range, e.g. 4–6 orders of magnitude, of received signal strengths. Receiver monitoring is best done without attaching a circuit to the same node of the photodiode, cathode or anode, from which the high speed modulated signal is extracted. Connecting both monitor circuit and high speed data circuit to the same node increases the complexity of the high speed data circuit without providing compensating benefits. Attaching the monitor circuit to photodiode node which is not connected to the high speed data circuit allows for a simple overall design.

The following circuits are designed to monitor received signals with strengths varying by 4–6 orders of magnitude without effecting received signal quality.

Figure 2A:
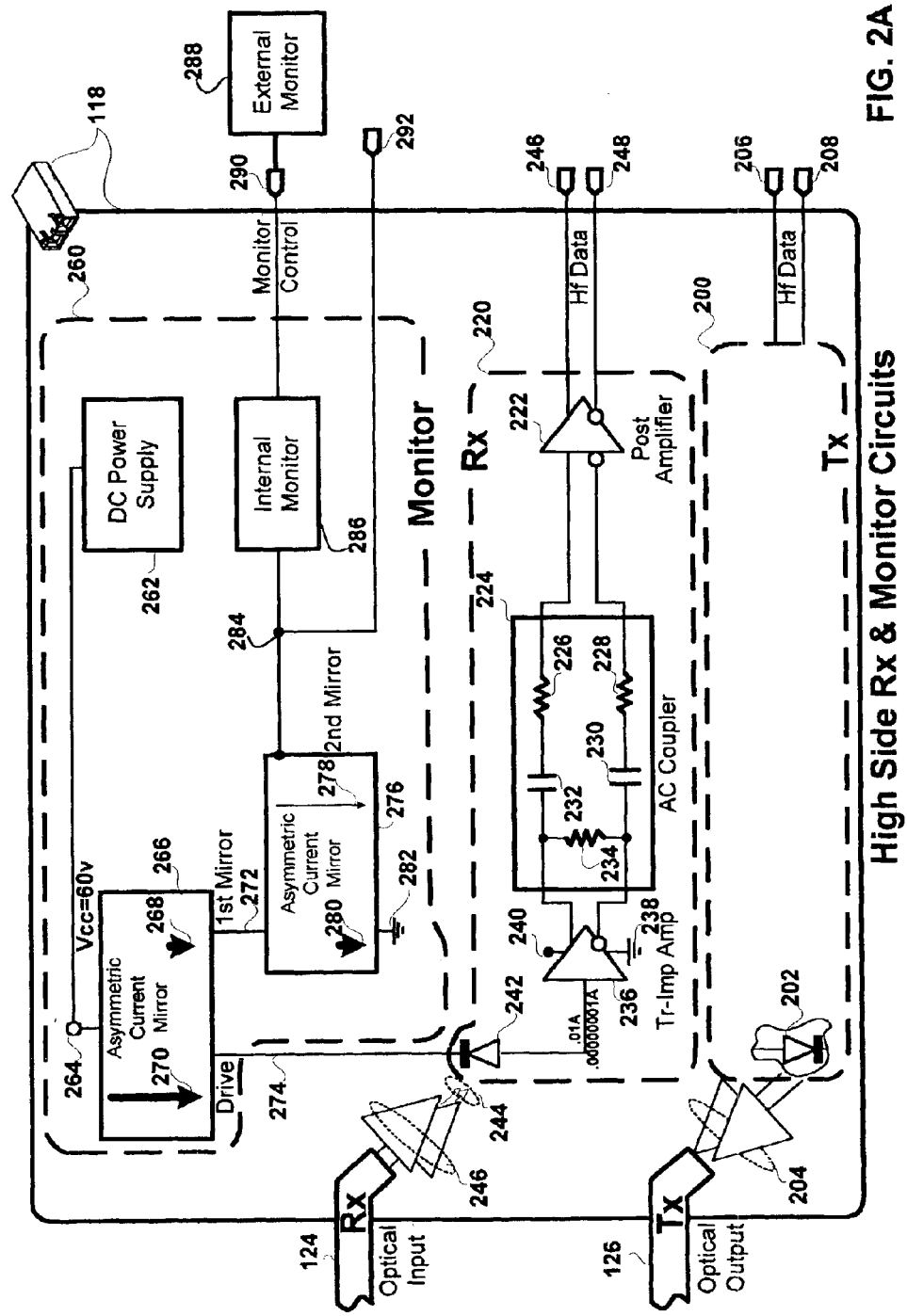
FIG. 2A is a circuit diagram of an embodiment of the invention with an optical transceiver having a monitoring circuit coupled on the high side of the optical receiver to monitor the received signal strength.

FIG. 2A is a circuit diagram of an embodiment of the invention with an optical transceiver 118 (See FIG. 1) with a transmitter 200, a receiver 220 and a monitoring circuit 260. The transmitter 200 includes one or more differential signal inputs 206–208 for high speed digital data input from the associated LAN and a photo-diode 202 which transmits an optical beam 204 modulated with the high frequency data into the corresponding fiber optic 126 which forms a segment of the optical network.

The receiver includes a photo-detector 242 optically coupled to the optical network via fiber optic 124 to receive an optically modulated information bearing signal there from. In an embodiment of the invention the photo-detector comprises a positive-intrinsic-negative (PIN) or an avalanche photo-detector (APD). A PIN operates at a 5 volt bias voltage level while an APD may operate at 40–60 volts. The signal strength of the received optical beam may vary over 4–6 orders of magnitude as represented by beams 244 and 246. In the embodiment of the invention shown in FIG. 2A the cathode of the photo-detector is coupled to the input of a trans-impedance amplifier (TIA) 236 which operates as a current sink for the photo-detector. The TIA has a wide dynamic range and exceptional linearity of performance. The high frequency modulated and amplified electrical data is output from the TIA on differential signal lines, which are impedance matched and AC coupled with the rest of the receiver circuitry via AC coupler 224. In the embodiment shown, the AC coupler includes high frequency coupling capacitors 230–232, which form together with series and parallel coupled resistors 234, 226, 228 an impedance matching network. The differential output of the AC coupler is subject to any post amplification in amplifier 222 and the opto-electrically converted signal is output by the receiver on one or more signal lines 246–248 to the rest of the receive path circuitry, e.g. the router 114 for example (See FIG. 1).

A monitor circuit 260 couples on the high side of the receiver to monitor the received signal strength as measured by the photo-detector 242. The monitor circuit includes a pair of current mirrors 266, 276 which together provide a means for highly linear and low power pathway for monitoring the photo-detector current consumption.

The $1^{st}$ current mirror 266 has two legs, a.k.a. a primary leg and a mirror leg, through which pass the primary current 270 to the photo-detector and the mirror current 268 to the second current mirror respectively. Both legs of the $1^{st}$ current mirror 266 couple on the positive side to a voltage source node 264, which in the example is coupled to a DC power supply 262. The primary leg of the $1^{st}$ current mirror couples via line 274 with the anode of the photo-detector 242. In the example shown the supply voltage is 60 volts and the photo-detector is an APD. In alternate embodiments of the invention a PIN type photo-detector may be utilized with a corresponding reduction in the supply voltage level to 5 volts for example. The current flow in the $1^{st}$ current mirror's primary and mirror legs is resistively biased to a highly asymmetrical level in which current flow in the mirror leg is a fractional part of the current flow in the primary leg. This significantly reduces the amount of power required to monitor the current flow in the photo-detector. However, the asymmetric current flow in the primary and mirror legs in the $1^{st}$ current mirror 266 would, if this were the only current mirror, result in a high degree of non-linearity between the monitored current, and the actual photo-detector current. The unique configuration of the $1^{st}$ and $2^{nd}$ current mirrors together is used to linearize the relationship between the monitored current and the actual photo-detector current, despite an order of magnitude or more of difference between the magnitudes of the photo-detector and monitored current.

The $2^{nd}$ current mirror 266 has two legs, a.k.a. a primary leg and a mirror leg which couple in series to an electrical sink 282. The mirror current 268 from the first current mirror flows through a series coupling 272 through the primary leg of the $2^{nd}$ current mirror 276 to the electrical sink. The current 280 in the $2^{nd}$ current mirror's primary leg is identical in magnitude and direction to the mirror current 268 from the current mirror 266. Both legs of the $2^{nd}$ current mirror 276 are resistively biased to a highly asymmetrical level in which current flow in the primary leg is a fractional part of the current flow in the mirror leg. This significantly reduces the amount of power required to monitor the current flow in the photo-detector, and linearizes the ratio of the current flow in the primary leg of the $1^{st}$ current mirror 266 and the mirror leg of the $2^{nd}$ current mirror 276. The current 278 in the mirror leg flows from a source 284. The source may in alternate embodiments of the invention comprise: an internal monitor 286, an external monitor direct coupled via pin 290 to node 284, or a combination of an external and internal monitor. Pin 292 provides direct external access to node 284. The monitor provides a fixed voltage supply to the mirror leg of the $2^{nd}$ current mirror 276 and monitors the resultant current flow 278 which is linearly proportional to the current 270 flowing through the optical signal detector 242.

Figure 2B:
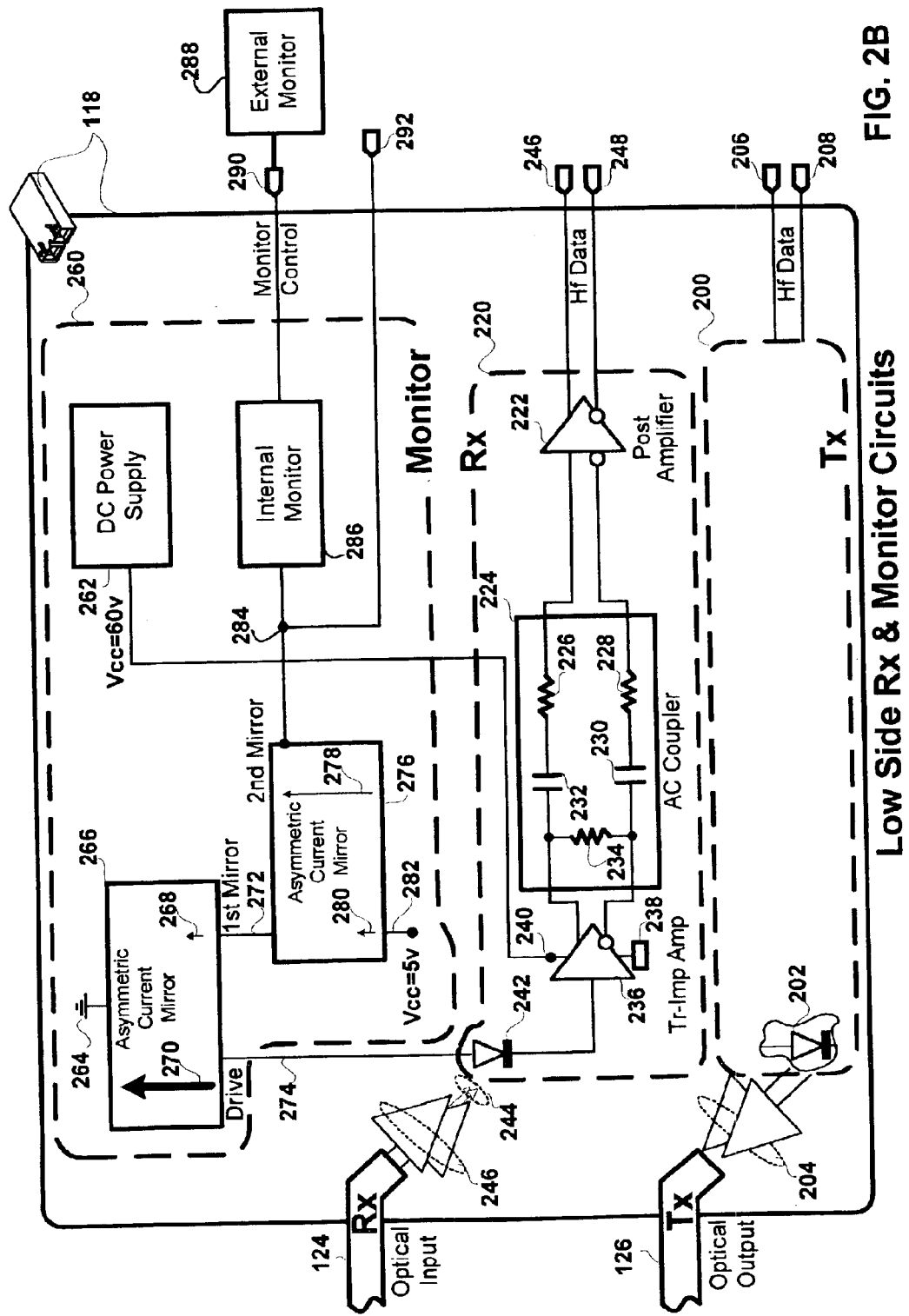
FIG. 2B is a circuit diagram of an embodiment of the invention with an optical transceiver having a monitoring circuit coupled on the low side of the optical receiver to monitor the received signal strength.

FIG. 2B is a circuit diagram of an embodiment of the invention with an optical transceiver having the monitoring circuit 260 coupled on the low side of the optical receiver 220 to monitor the received signal strength. The receiver includes the photo-detector 242 optically coupled to the optical network via fiber optic 124 to receive the optically modulated information bearing signal there from. In an embodiment of the invention the photo-detector comprises a positive-intrinsic-negative (PIN) or an avalanche photo-detector (APD). The signal strength of the received optical beam may vary over 4–6 orders of magnitude as represented by beams 244 and 246. In the embodiment of the invention shown in FIG. 2B the anode of the photo-detector is coupled to the input of the TIA 236, which operates as a current source for the photo-detector. The TIA has a wide dynamic range and exceptional linearity performance over currents ranging from less than 0.01 uA up to 2.5 mA. The TIA has a Vsource input 240 coupled to the DC power supply 260, which is part of the monitor circuit. The Vsink input 238 of the TIA is coupled to a voltage sink at a level less than that of the power supply. The TIA supplies current to the anode of the photo-detector to which its input is coupled. The high frequency modulated and amplified electrical data is output from the TIA on differential signal lines to the AC coupler 224. The output of the AC coupler is subject to amplification in post amplifier 222. The output of the post amplifier is coupled to one or more high frequency data outputs 246–248.

The monitor circuit 260 couples on the low side of the receiver to monitor the received signal strength as measured by the photo-detector 242. As discussed above the monitor circuit includes a pair of current mirrors with asymmetrical resistances coupled to one another in series along corresponding mirror legs. Both legs of the $1^{st}$ current mirror 266 couple to a voltage sink 264 which in the example shown is an electrical ground. The photo-detector current 270 flows through the primary leg of the $1^{st}$ current mirror 266 to the electrical sink 264. The mirror current 268 flows through the mirror leg to the electrical sink 264. The primary leg of the current mirror 266 couples via line 274 with the cathode of the photo-detector 242. In the example shown the supply voltage to the TIA is 60 volts and the photo-detector is an APD. In alternate embodiments of the invention a PIN type photo-detector may be utilized with a corresponding reduction in the supply voltage level to 5 volts for example. The current flow in the primary and mirror legs of current mirror 266 is resistively biased to a highly asymmetrical level in which current flow in the mirror leg is a fractional part of the current flow in the primary leg. This significantly reduces the amount of power required to monitor the current flow in the photo-detector. The unique configuration of the $1^{st}$ and $2^{nd}$ current mirrors together is used to linearize the relationship between the monitored current and the actual photo-detector current, despite an order of magnitude or more of difference between the magnitudes of the photo-detector and monitored current.

The primary and mirror leg of the $2^{nd}$ current mirror 276 couple in series to a voltage source with a relatively low voltage as compared to that required to bias the photo-detector. In the embodiment shown the voltage source Vcc is 5 volts. The current 280 in the primary leg of the $2^{nd}$ current mirror flows through the series coupling 272 with the mirror leg of the $1^{st}$ current mirror 266 to the electrical sink 264. The current 280 in the $2^{nd}$ current mirror's primary leg is identical in magnitude and direction to the mirror current 268 from the $1^{st}$ current mirror 266. Both legs of the $2^{nd}$ current mirror 276 are resistively biased to a highly asymmetrical level in which current flow in the primary leg is a fractional part of the current flow in the mirror leg. This significantly reduces the amount of power required to monitor the current flow in the photo-detector, and linearizes the ratio of the current flow in the primary leg of the $1^{st}$ current mirror 266 and the mirror leg of the $2^{nd}$ current mirror 276. The current 278 in the mirror leg flows to an electrical sink 284. The sink may in alternate embodiments of the invention comprise: an internal monitor 286, an external monitor direct coupled via pin 290 to node 284, or a combination of an external and internal monitor. Pin 292 provides direct external access to node 284. The monitor provides a fixed voltage sink to the mirror leg of the $2^{nd}$ current mirror 276 and monitors the resultant current flow 278 which is linearly proportional to the current 270 flowing through the optical signal detector 242.

In the embodiments of the invention shown in FIGS. 2A–B the ratio of the magnitudes of the resistances on the primary and mirror legs of both current mirrors 266, 276 are inversely related to one another. In an embodiment of the invention the resistance of the primary leg on the $1^{st}$ current mirror 266 equals the resistance on the mirror leg of the $2^{nd}$ current mirror 276 and the resistance of the mirror leg on the $1^{st}$ current mirror equals the resistance on the primary leg of the $2^{nd}$ current mirror. The $1^{st}$ current mirror 266 operates as a current divider with a mirror current that corresponds with a fractional part of the primary current. In the $2^{nd}$ current mirror the relationship is reversed with the $2^{nd}$ current mirror operating as a current multiplier with the mirror current corresponding with a positive multiple of the primary current. In an embodiment of the invention the combined series coupled current mirrors provide unity gain of the mirror current on the $2^{nd}$ current mirror with respect to the photo-detector drive bias current on the primary leg of the $1^{st}$ current mirror.

Overall power consumption is reduced by virtue of both the current division that takes place in the $1^{st}$ current mirror and by the reduced voltage differential on the mirror leg of the $2^{nd}$ current mirror. This latter feature minimizes the power required to operate the $2^{nd}$ current mirror as a current multiplier.

The wide operational current range of the photo-detector places a significant demand on the current mirrors in terms of linearity and range of performance, e.g. currents ranging over 4–6 orders of magnitude. The current mirror embodiments shown in the following FIGS. 3A–B and 4A–B meet these requirements.

Figure 3A:
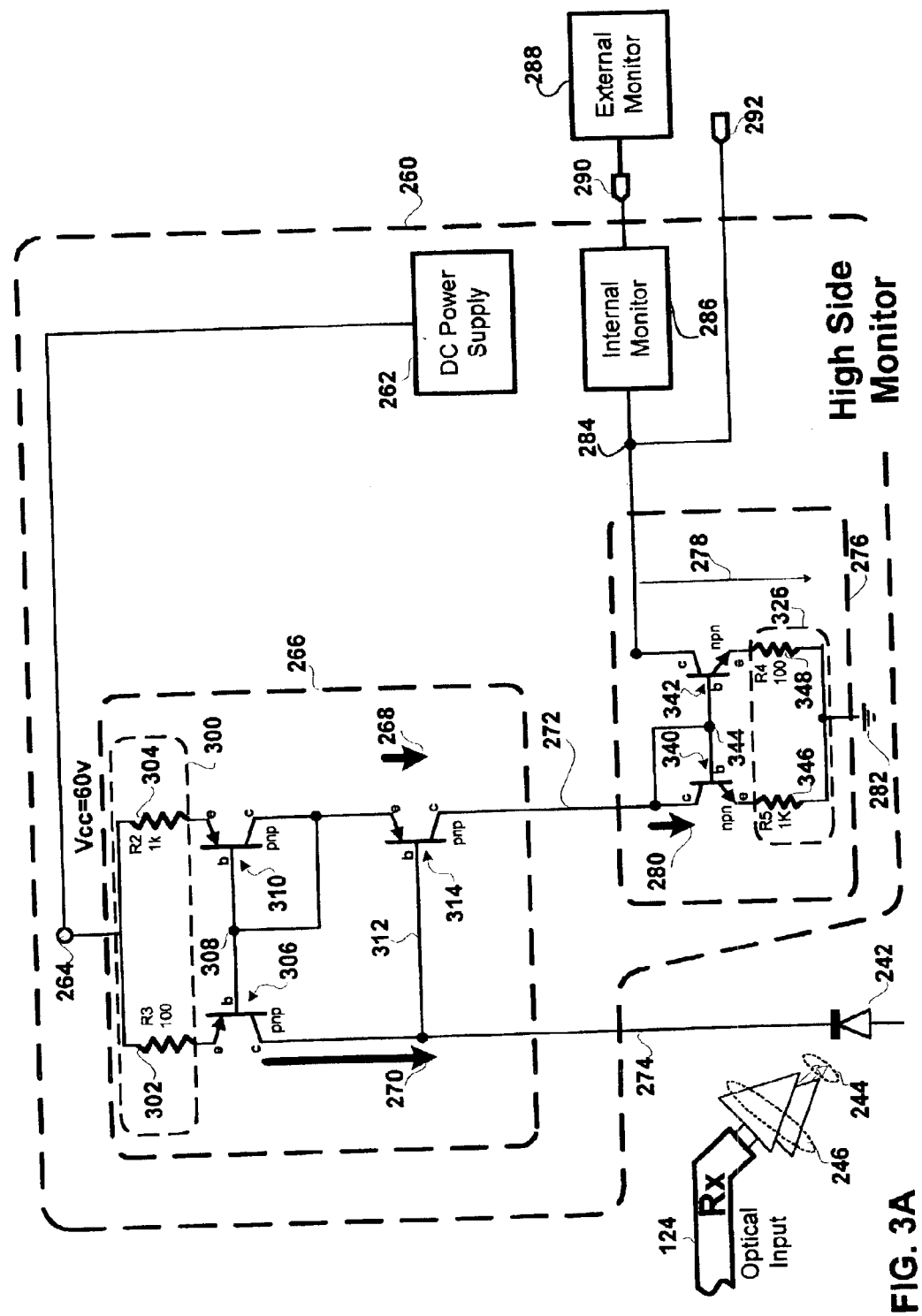
FIGS. 3A–B are detailed circuit diagrams of alternate embodiments of the monitor circuit shown in FIG. 2A.
Figure 3B:
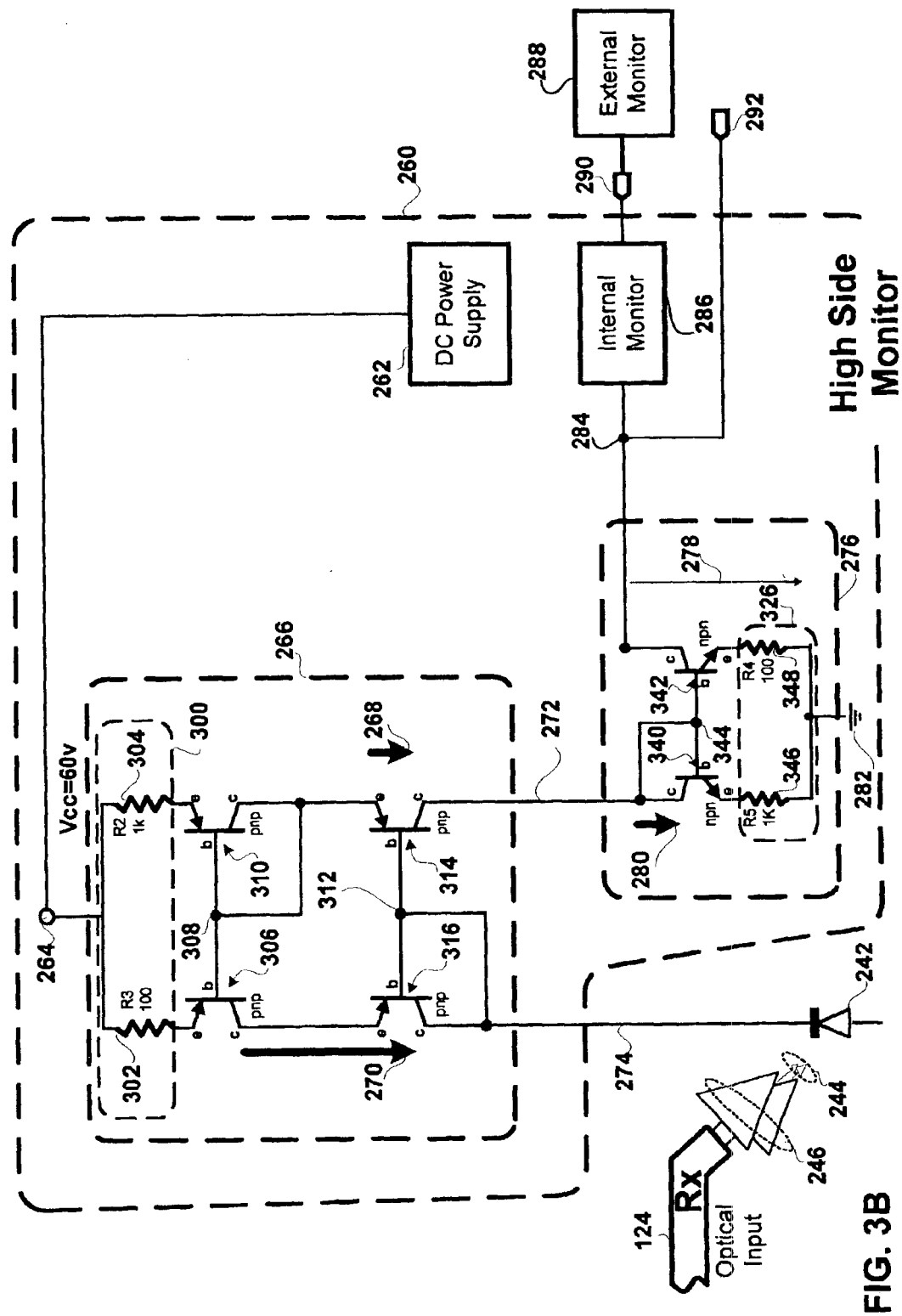

FIG. 3A–B are detailed circuit diagrams of alternate embodiments of the monitor circuit shown in FIG. 2A and specifically the dual current mirror portion thereof. In an embodiment of the invention $1^{st}$ current mirror includes a pair of back-to-back bipolar type transistors 306 and 310 configured as a current mirror. The primary transistor 306 defines the primary leg of the $1^{st}$ current mirror in which flows the primary current 270 to the photo-detector 242. The mirror transistor 310 defines a portion of the mirror leg in which flows the mirror current 268. The bases of the primary and mirror transistors are coupled to one another at node 308 and to the collector of the mirror transistor. In the high side embodiment shown in FIGS. 3A–B the primary and mirror transistors of the $1^{st}$ current mirror 266 comprise 'pnp' type polarity bipolar transistors. The current mirror may also include an additional transistor 314 on the mirror leg the base of which is coupled by line 312 to the collector of the primary transistor 306. To reduce power consumption for the transceiver as a whole the mirror current may be significantly reduced by series coupling of asymmetric resistive elements 300 between the primary and mirror legs and the electrical source at node 264. In the embodiment shown resistors 302 and 304 couple the primary leg and mirror legs respectively to the power supply 262 through node 264. The resistance is set so that the primary leg has a resistance which is a fractional part of the resistance on the mirror leg thus ensuring a highly asymmetric current flow, e.g. an order of magnitude or more difference, between the primary and mirror legs. In the embodiment shown resistor 302 on the primary leg has a value of 100 Ω and resistor 304 on the mirror leg has a value of 1000 Ω. The resultant highly asymmetric current flows result in a highly non-linear tracking of the photo-detector current by the mirror leg of the $1^{st}$ current mirror. The primary and mirror currents may differ both in absolute magnitude across the range, e.g. more than 75% difference; as well as in the linearity of the relative magnitudes across the range, e.g. 10% variation.

The Ebers-Moll model of the bipolar transistor provides insight to and quantification of the source of non-linearity and is set forth in the following Equation 1:

Equation 1:

$$I_c = I_o\left(e^{\frac{cV_{be}}{kT}} - 1\right)$$

where Ic is the collector current, Vbe is the base to emitter voltage drop, Io is the reverse leakage current from the emitter to the base, c is the elementary unit of charge, k is the Boltzmann constant, and T is the absolute temperature (in Kelvin). With typical doping levels, the leakage current arising from the "intrinsic" behavior of the pure semiconductor is very small, and the second term -Io is negligible, giving a simple exponential dependence of Ic on Vbe.

An extension to Ebers-Moll that must be considered in current mirrors is that of the Early effect. The Early effect describes the proportionate change in base-to-emitter voltage for bipolar transistors which occurs with changes in collector-to-emitter voltage. The non-linearity between the mirror current and the photo-detector current results from the differences in the collector-to-emitter voltage drops in the two transistors and the concomitant difference in the base-to-emitter voltages of the two transistors due to the Early effect.

Collector-to-emitter voltage differences between the two transistors of a current mirror can be 40 volts in an APD and 4 volts in a PIN implementation. The primary transistor is typically exposed to a voltage drop of 0.7 volts while the mirror transistor is subject to a voltage drop substantially equal to the fill supply voltage. The collector currents in the primary and mirror transistors are very sensitive to differences in the base-to-emitter voltages between the two transistors. The disparity in base-to-emitter voltage drops between the primary and mirror transistors results in substantial and non-linear difference between the mirror current and the photo-detector current.

Transistor 314 tends to reduce the difference in the collector-to-emitter voltage drops between each of the pair of transistors 306, 310. This transistor element exhibits a non-linear voltage drop between the at least two terminals in response to varying levels of the mirror current. The voltage drop between the two terminals is substantially independent of mirror current. This characteristic improves compliance between the mirror current and the photo-detector current by reducing the collector-to-emitter and hence the base-to-emitter voltage differences between the primary and mirror transistors 306 and 310 respectively. The disparity in performance due to the Early effect is therefore substantially reduced.

A separate source of non-linearity is the asymmetry of current flow between the primary and mirror legs of a current mirror where the emitter resistors (306 and 310 in FIG. 3A) are substantially different in value. This effect is significant enough so that transistor 314 alone is not sufficient to linearize performance across a broad range of photo-detector current levels spanning for example 6 orders of magnitude.

The $2^{nd}$ current mirror 276 provides the means for extending the overall linear monitoring range of the photo-detector 242. This is accomplished by series coupling of the mirror leg of the $1^{st}$ current mirror with the primary leg of the $2^{nd}$ current mirrors and by asymmetrically resistively biasing the primary and mirror legs of the $2^{nd}$ current mirror so that it operates as a current multiplier whose multiplication factor is the inverse of the current division factor of the $1^{st}$ current mirror. This $2^{nd}$ mirror introduces a non-linearity into the overall transfer function of the circuit which closely compensates for the emitter resistor variance asymmetry of the $1^{st}$ mirror, thus substantially improving the linearity of the circuit overall.

The $2^{nd}$ current mirror in this embodiment of the invention includes a pair of back-to-back bipolar type transistors 342 and 340 configured as a current mirror. The mirror transistor 342 defines the mirror leg of the $2^{nd}$ current mirror in which flows the mirror current 278 from node 284. The primary transistor 340 defines a portion of the primary leg in which flows the primary current 280. The bases of the primary and mirror transistors are coupled to one another at node 344 and to the collector of the primary transistor. In the high side embodiment shown in FIGS. 3A–B the primary and mirror transistors of the $2^{nd}$ current mirror 276 comprise 'npn' type polarity bipolar transistors. The primary and secondary legs of the $2^{nd}$ current mirror couple through asymmetric resistive elements 326 to an electrical sink 282. In the embodiment shown, resistors 346 and 348 couple the primary and mirror legs respectively to the electrical sink 282. The resistance is set so that the mirror leg has a resistance which is a fractional part of the resistance on the primary leg thus ensuring a highly asymmetric current flow, e.g. an order of magnitude or more difference, between the mirror and primary legs. In the embodiment shown resistor 348 on the mirror leg has a value of 100 Ω and resistor 346 on the primary leg has a value of 1000 Ω. The power consumption on the primary leg of the second current mirror is a function of both the voltage applied at node 284 as well as the resistance of the mirror leg. In an APD embodiment of the invention, the voltage level at node 284 is kept at a fraction of the level of the DC power supply, e.g. 5 volts vs. 60 volts thus greatly reducing the voltage differential on the mirror leg of the $2^{nd}$ current mirror and hence the level of the mirror current 278 and power consumption on the mirror leg.

The collector of the mirror transistor 342 couples to an electrical source at monitor node 284. The source may in alternate embodiments of the invention comprise: the internal or external monitors 286 and 288 respectively. The monitor provides a fixed voltage supply to the primary leg of the $2^{nd}$ current mirror 276 and monitors the resultant current flow 278 which is linearly proportional to the current 270 flowing through the optical signal detector 242.

FIG. 3B shows an alternate embodiment of the high side monitor in which the $1^{st}$ current mirror 266 in which a second "pnp" type polarity bipolar transistor 316 is series coupled with the primary transistor 306 on the primary leg. The emitter terminal of the bipolar transistor 316 is coupled to the collector of the primary transistor and the collector is coupled to the photo-detector 242. The base is coupled to the collector of the mirror transistor 314 and to the emitter.

In the embodiments shown in FIGS. 3A–B the resistor 302 coupled to the primary leg serves the function of varying the supply voltage inversely with respect to the strength of the received optical signal. Thus the supply voltage to the primary transistor 306 is reduced as the optical signal strength increases, thereby improving the performance of the APD. Such resistor would not be necessary in an embodiment of the invention in which a PIN type photo-detector was utilized.

Figure 4A:
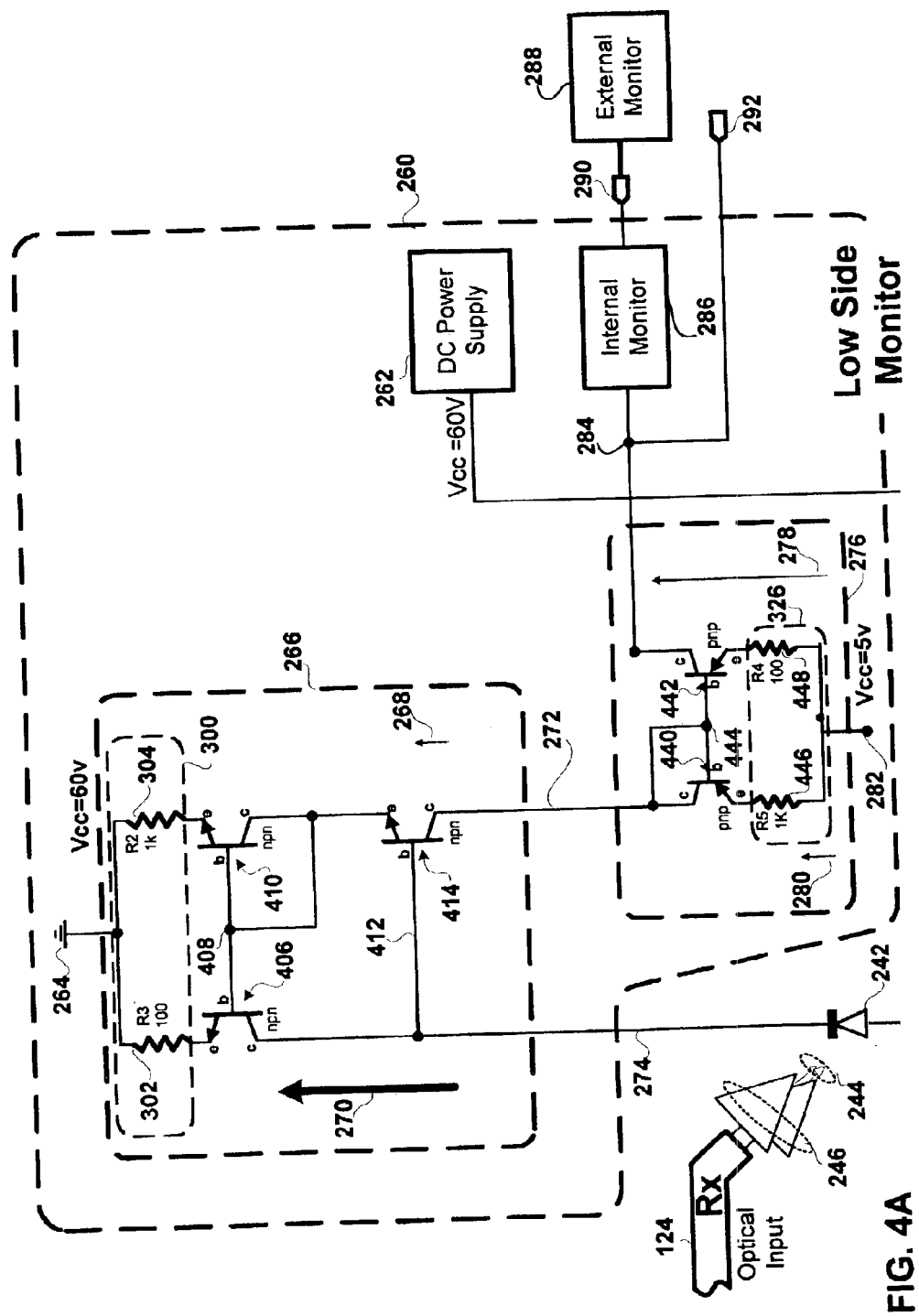
FIGS. 4A–B are detailed circuit diagrams of alternate embodiments of the monitor circuit shown in FIG. 2B.
Figure 4B:
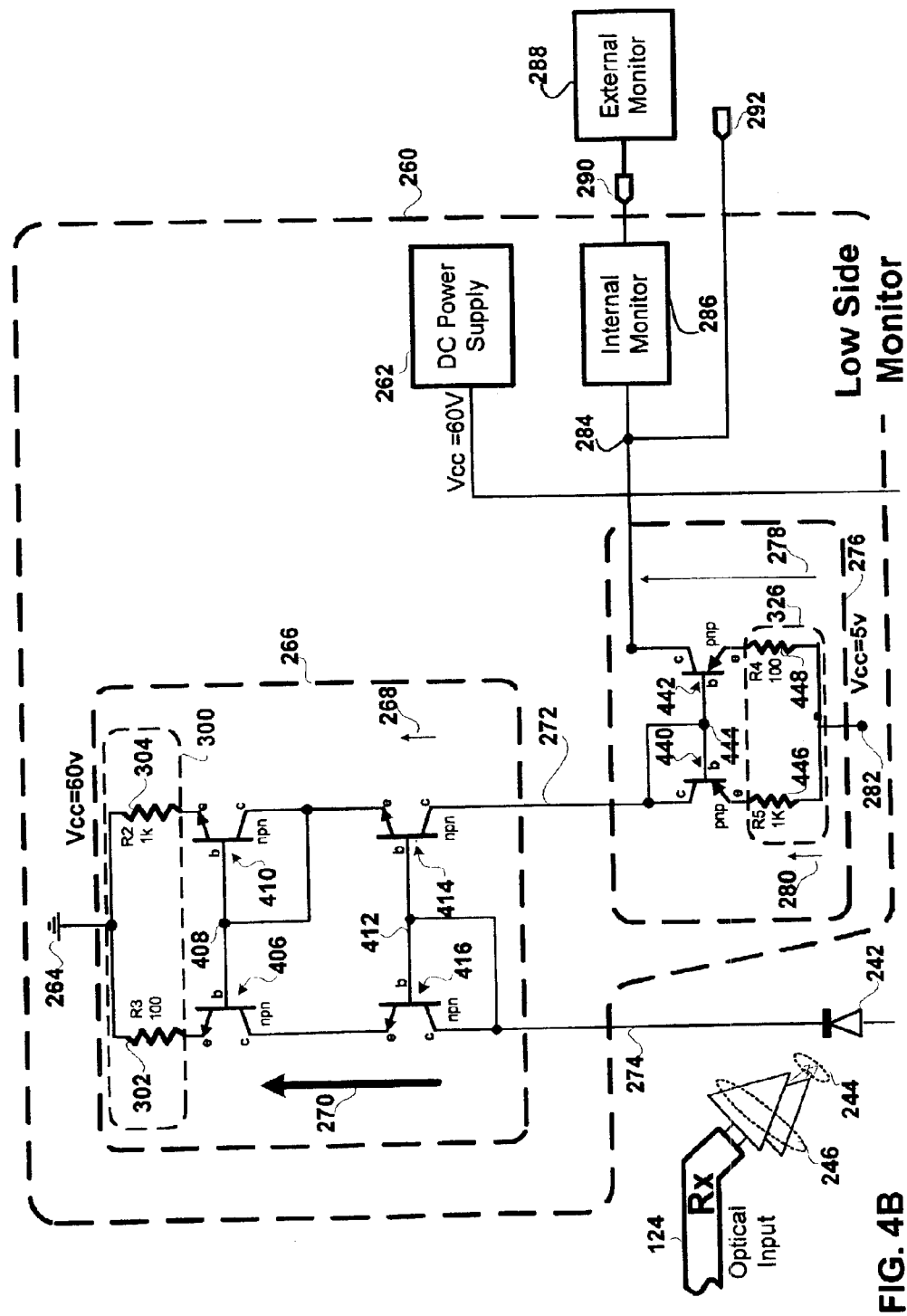

FIGS. 4A–B are detailed circuit diagrams of alternate embodiments of the monitor circuit shown in FIG. 2B with the monitor circuit 260 coupled on the low side of the receiver to monitor the received signal strength as measured by the photo-detector 242. The monitor circuit includes the dual current mirrors 266, 276. The current mirrors shown in FIGS. 4A–B are similar to those shown in FIGS. 3A–B respectively. However the $1^{st}$ current mirror couples the photo-detector to an electrical sink at node 264. The $2^{nd}$ current mirror also couples to an electrical sink. The transistors of the $1^{st}$ current mirror 266 are "npn" polarity type and the transistors of the $2^{nd}$ current mirror are "pnp" polarity type. The monitor node 284 operates as an electrical sink for the mirror leg of the $2^{nd}$ current mirror.

Figure 5B:
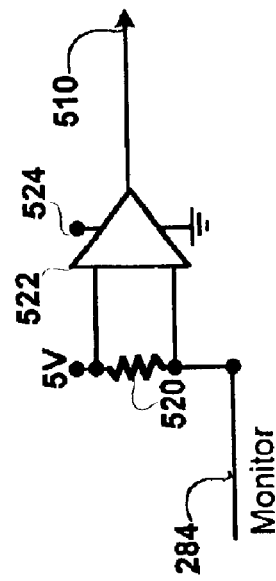
FIGS. 5A–B are detailed circuit diagrams of alternate embodiments of internal and external monitors.
Figure 5A:
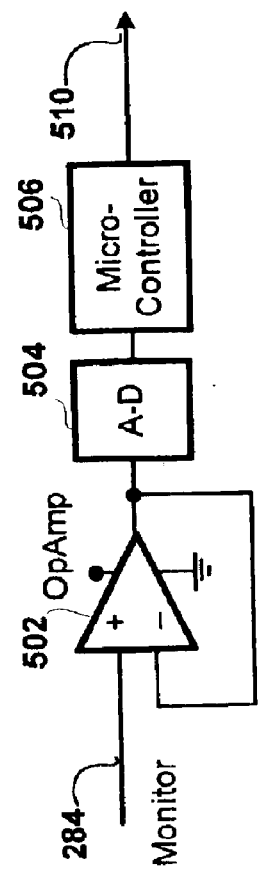

FIG. 5A–B are detailed circuit diagrams of alternate embodiments of internal and external monitors associated with alternate embodiments of the invention. In FIG. 5A a digital monitor is shown. This may be implemented internal or external to the transceiver. The monitor node 284 is coupled to the input of an operational amplifier 502. Op-amp 502 provides an amplified output proportional to the primary current 278 to an analog-to-digital (A/D) converter 504. A micro-controller 506 accepts the digital signal output of the A/D where it may be utilized as part of a diagnostic. The output of the micro-controller is available at pin 290 for use by network administrator or system level diagnostic and or maintenance circuitry, not shown. In an alternate embodiment of the invention an analog monitor is shown in FIG. 5B. The primary current 278 is monitored by conversion to a voltage proportional to current at monitor node 284. This is accomplished by an operational amplifier 522 inputs of which are coupled across resistor 520. Resistor 520 couples the monitor node to an electrical source, e.g. Vcc=5 Volts. The op amp output is proportional to the voltage drop across resistor 520 which in turn is proportional to the primary current 278. The output 510 of the op amp is supplied for use by network administrator for system level diagnostic and/or maintenance.

Figures 6A, 6B:
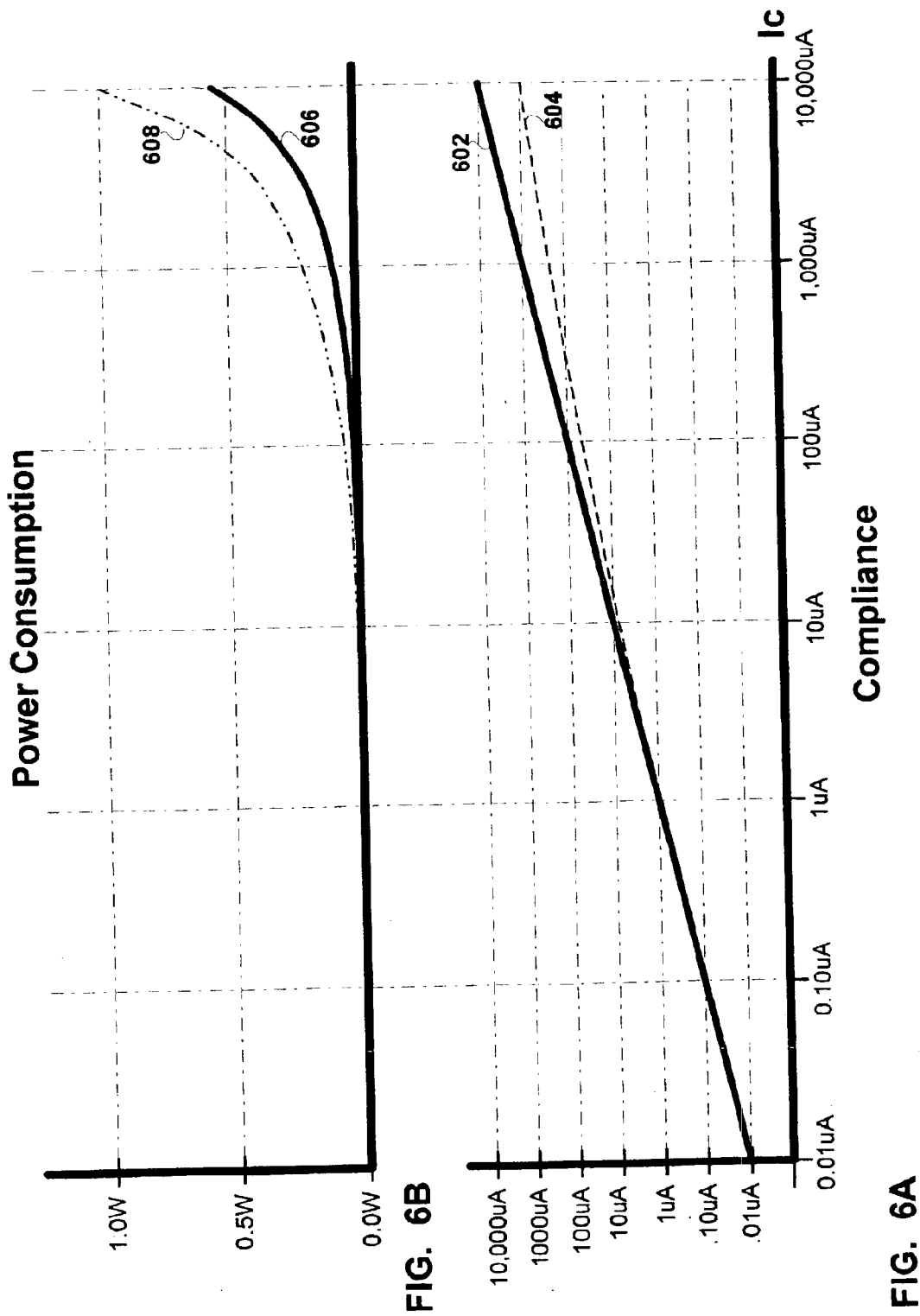
FIGS. 6A–B are graphs showing compliance and power consumption respectively for the monitor circuit of an embodiment of the invention.

FIG. 6A is a graph showing the compliance between the photo-detector current and the monitored current for the current invention. Reference line 602 shows the high degree of compliance of mirror current 278 vs. photo-detector current 270 for the dual asymmetric current mirror embodiment of the invention shown in FIG. 3A. (See FIG. 3A references 278 and 270). By way of comparison reference line 604 shows the considerable non-linearity in the compliance between mirror current 268 and photo-detector current 270 for a single asymmetric current mirror, i.e. current mirror 266 without current mirror 276.

FIG. 6B is a graph in which reference line 606 shows the power consumption of the dual asymmetric current mirror embodiment of the invention shown in FIG. 3A. Including the power associated with currents 270, 268/280, and 278 shown therein. By way of comparison reference line 608 shows the considerable increase in power consumption required by a single current mirror with symmetric resistances, i.e. current mirror 266 without current mirror 276 and with resistors 302–304 equal in value to one another.

As is evident from both FIGS. 6A–B the dual asymmetric current mirrors of the current invention have both exceptional compliance across a broad range of currents together with minimal power consumption. The exceptional performance of the current mirrors shown in FIGS. 3A–B and 4A–B allows improved monitoring of the photo-detector portion of the optical receiver for optical network setup, diagnostics, and preventive maintenance.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A circuit for monitoring an optical signal detector, comprising:
    a first current mirror with a primary current leg and a mirror current leg, and the primary current leg exhibiting a resistance corresponding with a fractional part of the resistance exhibited by the mirror current leg, and with the primary current leg of the first current mirror series coupled between the optical signal detector and one of an electrical source and an electrical sink; and
    a second current mirror with a primary current leg and a mirror current leg, and with the mirror current leg of the second current mirror exhibiting a resistance corresponding with a fractional part of the resistance exhibited by the primary current leg of the second current mirror, and with the primary current leg of the second current mirror series coupled with the mirror current leg of the first current mirror.

2. The circuit of claim 1, wherein the primary current leg and the mirror current leg of the second current mirror exhibits substantially similar asymmetries in resistance with respect to one another as the mirror current leg and the primary current leg of the first current mirror exhibit with respect to one another.

3. The circuit of claim 1, further comprising:
    at least one monitor component coupled to mirror current leg of the second current mirror to monitor the optical signal detector.

4. The circuit of claim 1, wherein the first current mirror further comprises:
    a first pair of resistors individually identified as a primary resistor and a mirror resistor coupling in parallel the primary and mirror current legs respectively of the first current mirror and the one of the electrical source and electrical sink and the primary resistor exhibiting a resistance corresponding with the fractional part of the resistance exhibited by the mirror resistor.

5. The circuit of claim 1, wherein the second current mirror further comprises:
    a primary resistor coupled in series with the primary leg of the second current mirror; and
    a mirror resistor coupled in series with the mirror leg of the second current mirror and with the mirror resistor exhibiting a resistance corresponding with a fractional part of the resistance exhibited by the primary resistor.

6. The circuit of claim 1, wherein the first and second current mirrors each comprise:
    a pair of transistors of a bipolar type coupled in a mirror configuration.

7. The circuit of claim 1, wherein the first and second current mirrors each comprise respectively:
    a pair of bipolar transistors coupled in a mirror configuration, and with a polarity of the pair of bipolar transistors comprising the first current mirror opposite to the polarity of the pair of transistors comprising the second current mirror.

8. The circuit of claim 1, wherein the optical signal detector comprises:
    at least one of an avalanche photo-detector (APD) and a positive-intrinsic-negative (PIN) photo-detector.

9. A circuit for monitoring an optical signal detector, comprising:
    a current divider current mirror with a mirror leg and a primary leg coupled to the optical signal detector, and the current divider current mirror configured to generate mirror leg current corresponding with a fraction of the primary leg current; and
    a current multiplier current mirror with a mirror leg and a primary leg coupled to the mirror leg of the current divider current mirror, and the current multiplier current mirror configured to generate mirror leg current corresponding with a multiple of the primary leg current.

10. The circuit of claim 9, further comprising:
    a first resistive element coupled to the current divider current mirror to limit mirror leg current to a fraction of the primary leg current in the current divider current mirror; and
    a second resistive element coupled to the current multiplier current mirror to limit primary leg current to a fraction of the mirror leg current in the current multiplier current mirror.

11. The circuit of claim 9, wherein each of the first and second resistive elements further comprise:
    a pair of resistors coupled in parallel to the mirror and primary legs of the corresponding one of the current divider and current multiplier current mirrors.

12. The circuit of claim 9, wherein the multiplier and divider current mirrors each comprise:
    two pairs of transistors with the transistors of each pair coupled to one another in a mirrored configuration with the primary and mirror legs associated with corresponding transistor among each pair of transistors.

13. The circuit of claim 9, wherein the multiplier and divider current mirrors each comprise:
    a pair of transistors of a bipolar type coupled in a mirror configuration.

14. The circuit of claim 13, wherein the pair of transistors comprising the current multiplier current mirror exhibit opposite polarities with respect to the pair of transistors comprising the current divider current mirror.

15. The circuit of claim 9, further comprising:
    at least one monitor component coupled to the mirror leg of the current multiplier current mirror to monitor the primary leg current of the current divider current mirror.

16. The circuit of claim 9, wherein the optical signal detector comprises:
    at least one of an avalanche photo-detector (APD) and a positive-intrinsic-negative (PIN) photo-detector.

17. An optical transceiver with an optical signal generator and an optical signal detector, comprising:
    a current divider current mirror with a mirror leg and a primary leg coupled to the optical signal detector, and the current divider current mirror configured to generate mirror leg current corresponding with a fraction of the primary leg current; and
    a current multiplier current mirror with a mirror leg and a primary leg coupled to the mirror leg of the current divider current mirror, and the current multiplier current mirror configured to generate mirror leg current corresponding with a multiple of the primary leg current.

18. A method for monitoring current in an optical signal detector comprising:

generating a first mirror current corresponding to a fraction of the current in the optical signal detector;

generating a second mirror current corresponding to a multiple of the first mirror current generated in the first generating act; and monitoring the current in the optical signal detector via the second mirror current generated in the second generating act.

19. The method of claim 18, wherein the first and the second generating act produce a unity gain between the current in the optical signal detector and the second mirror current.

20. The method of claim 18, wherein the second act of generating further comprises:

minimizing a voltage differential associated with the second generating act, thereby to minimize a corresponding power consumption.

* * * * *